Dec. 21, 1937.  M. L. STRAWN  2,102,655
MACHINE TOOL
Filed June 12, 1936  3 Sheets-Sheet 1
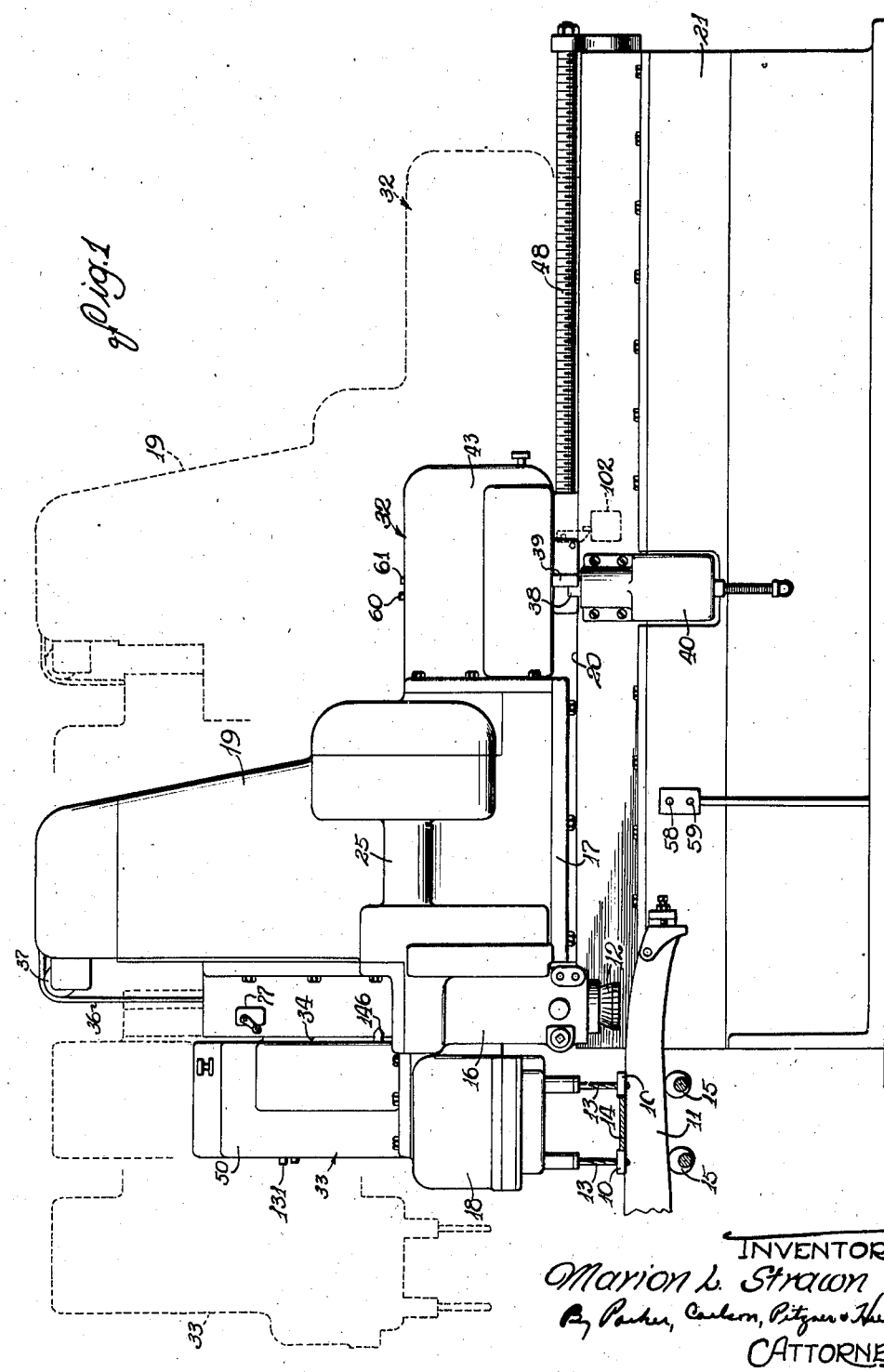

Dec. 21, 1937.   M. L. STRAWN   2,102,655
MACHINE TOOL
Filed June 12, 1936   3 Sheets-Sheet 2
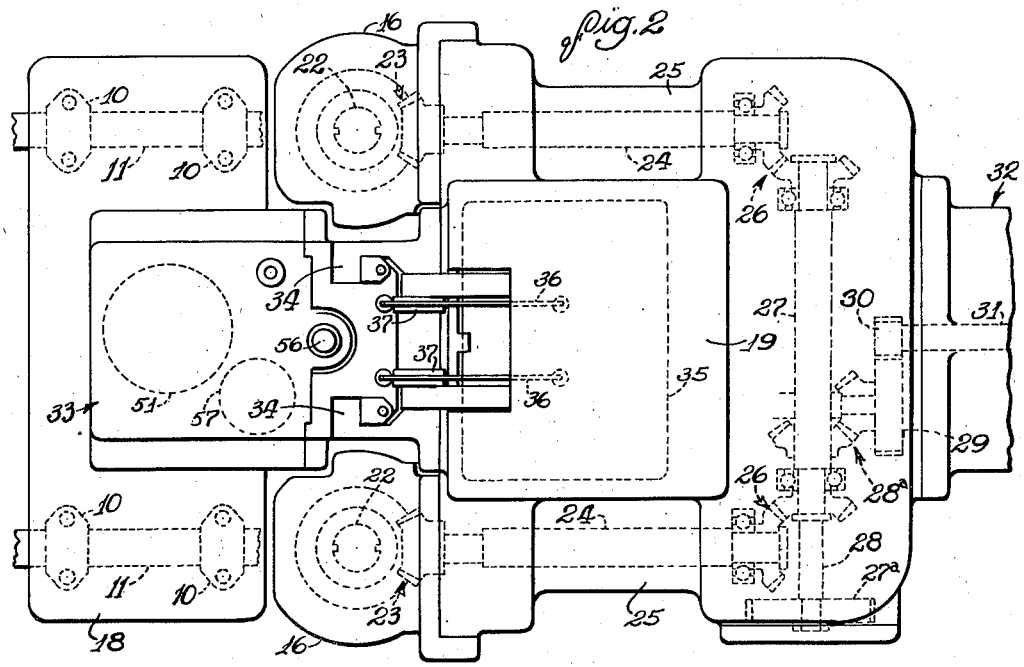
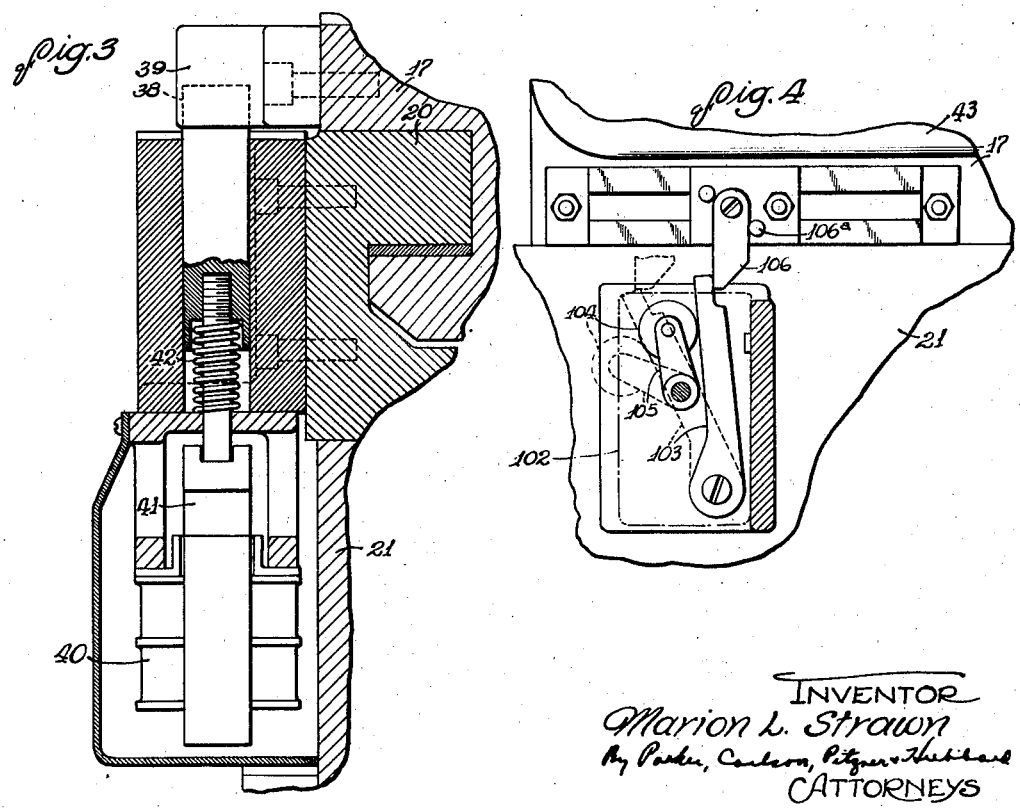

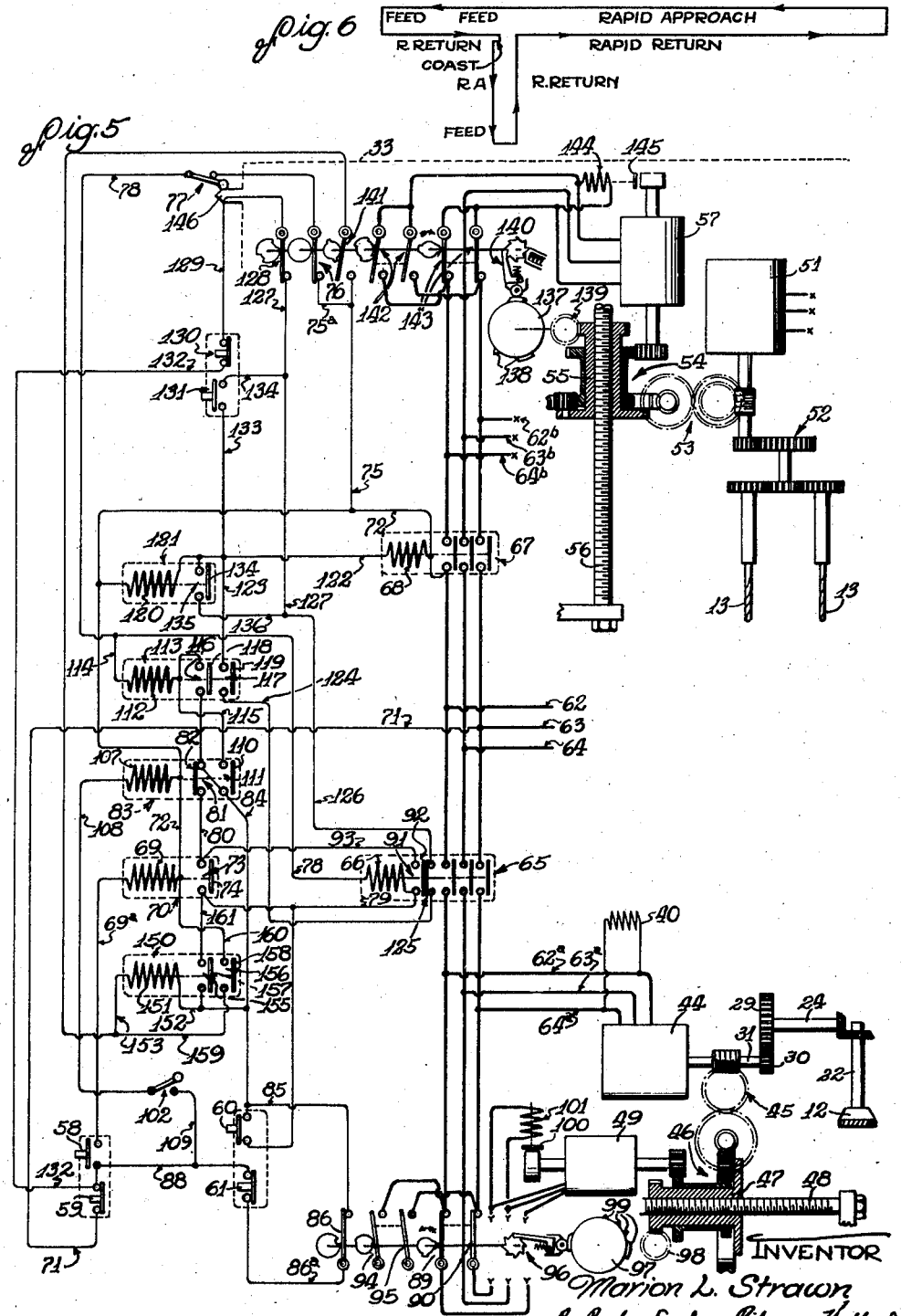

Patented Dec. 21, 1937

2,102,655

UNITED STATES PATENT OFFICE 2,102,655

MACHINE TOOL

Marion L. Strawn, Rockford, Ill., assignor to The Ingersoll Milling Machine Company, Rockford, Ill., a corporation of Illinois Application June 12, 1936, Serial No. 84,869

16 Claims. (Cl. 29—26)

This invention relates generally to machine tools and more particularly to those for performing metal removing processes such as milling, drilling, boring, grinding, and the like.

One object of the invention is to provide a machine for the above purpose having a novel arrangement for effecting relative movement between the work supporting member and tool supporting member of the machine of such character that the work piece and metal removing tool will be indexed or positioned with a high degree of accuracy relative to each other.

More specifically, it is an object of the invention to provide a machine for the above purpose in which the relatively movable tool and work supporting members are accurately positioned with respect to each other by reversing the direction of movement of one of the members in response to its passage past a predetermined point and then arresting its return movement at a predetermined and accurately defined working position by a positive stop interposed in its path of movement.

Another object of the invention is to provide a machine for sequentially performing a plurality of metal removing operations on a work piece of such character that the various metal removing operations are sequentially performed at points on the work piece which are accurately dimensioned with respect to each other and with respect to the contour of the work piece. For this purpose, the machine preferably includes a relatively movable work support and a tool head, and an arrangement for accurately positioning them with respect to each other, as well as a second tool head mounted for movement with the first tool head and carrying a tool which is movable into and out of operative engagement with the work piece independently of the movement of the first tool head.

A further object of the invention is to provide a machine tool having a plurality of metal removing tools and including an improved automatic arrangement adapted to move the tools and a work piece sequentially into operative relation with a rapid traverse movement and also to effect a sequential relative feed motion of the tools and work piece so that various metal removing operations may be sequentially performed by the tools in a minimum amount of time and with a minimum amount of manipulation of the machine by the operator.

Further objects and advantages of the invention will become apparent as the following description proceeds and the features of novelty which characterize the invention will be pointed out with particularly in the claims annexed to and forming a part of this specification.

For a better understanding of the invention, reference may be had to the accompanying drawings in which Figure 1 is a side elevation of a machine tool exemplifying the invention and adapted to perform a plurality of metal removing operations on automobile chassis.

Fig. 2 is a partial plan view of the machine shown in Fig. 1.

Fig. 3 is an enlarged fragmentary detail end elevation of the positive stop mechanism and actuating solenoid therefor for one of the elements shown in Fig. 1.

Fig. 4 is an enlarged fragmentary side elevation of a limit switch mechanism included in the machine shown in Fig. 1.

Fig. 5 is a wiring diagram of the control and power supply circuits of the machine shown in Fig. 1 in connection with the diagrammatically illustrated parts of the power actuating mechanisms for the metal removing tools.

Fig. 6 is a diagrammatic representation of the cycle of operation of the elements of the machine.

The machine tool illustrated in the drawings includes a plurality of tool supports which are relatively movable with respect to a work support. This relative movement between the tool supports and the work support is preferably effected sequentially by suitable power actuating mechanism so that one metal removing operation may be performed on a work piece carried by the work support and then a second metal removing operation performed on the previously machined portion of the work piece.

In the form shown in the drawings for purposes of illustration, the invention is embodied in a machine tool arranged to machine smooth surfaces on spring pads 10 of an automobile chassis 11 and sequentially to drill holes in the machined surfaces of the pads for the reception of bolts adapted to secure the springs in place. The surfaces of the pads are machined by face type milling cutters 12, which are rotatable about a vertical axis. The holes are then formed in the machined surfaces of the pads by drills 13. Preferably, the chassis 11, while operated upon, is firmly clamped against a rigid horizontal plate 14 by eccentric clamping members 15 of a suitable work support.

The metal removing tools are preferably carried by tool heads or tool supports which are detachably secured to self-contained power units containing prime movers for actuating the same. Greater flexibility in the use of the machine is obtained. In the machine illustrated, the milling cutters 12 are carried by tool heads 16 detachably secured on opposite sides of the forward end of a reciprocable carriage 17. The drills 13 are in turn carried by a tool head 18 which is movably mounted on the front of a vertical column 19 extending upwardly from the carriage 17. Suitable horizontal ways 20 slidably support the carriage 17 on a bed frame 21.

As best shown in Fig. 2, the cutters 12 are mounted on the lower ends of the vertically extending spindles 22, which are driven through bevel gears 23 by horizontal shafts 24 journaled within housings 25 formed on the side of the carriage 17. The shafts 24 are in turn driven through bevel gears 26 by a shaft 27 connected through pick-off gears 27ᵃ to a shaft 28. The shaft 28 is driven by bevel gears 28ᵃ from the gear 29. This latter gear meshes with a pinion 30 secured to the outer end of the main drive shaft 31 of a power actuating mechanism or power unit 32. The power unit 32 is detachably secured to the rear end of the carriage 17 so that it may be readily replaced by a similar unit.

The tool head 18 for the drills 13 and a power actuating mechanism therefor are preferably movably supported on what may conveniently be termed a unitary tool supporting member formed by the tool heads 16 and their associated carriage structure. This construction results in a decrease in the size of the machine and makes it possible to effect greater accuracy of control of the points of contact of the work piece and tools. The speed of operation of the machine is also increased by this arrangement, since the tool head 18 is moved approximately into operative relation with the work piece at the same time that the tool heads 16 are moved into operative relation therewith and, consequently, a relatively small movement is required to bring the tool head 18 accurately into position. To this end, the tool head 18 is detachably secured to a power unit 33 which is in turn slidably supported on vertical ways 34 formed on the front face of the column 19. A counterweight 35, movable vertically within the hollow column 19, is connected to the power unit 33 by flexible cables 36 passing over pulleys 37 and serves to counterbalance the weight of the power unit 33 and tool head 18.

It will thus be seen that in the machine illustrated the carriage 17 may be moved forwardly until the milling cutters 12 engage the work piece, the column 19 and tool head 18 being approximately in the position shown in dotted lines at the left hand side of Fig. 1. After the spring pads 10 have been surfaced by the milling cutters 12, the carriage 17 is retracted to the position shown in full lines in Fig. 1 and the tool head 18 is moved downwardly until the drills 13 engage the machine surfaces of the spring pads 10. Upon the completion of the drilling operation, the tool head 18 and its attached power unit 33 are returned to their uppermost position and the carriage 17 is retracted to its original starting position shown in dotted lines at the right hand side of Fig. 1.

Accurate positioning of the tool head 18 with respect to the work support preparatory to the drilling operation is carried out in a novel manner and is effected by automatically reversing the effective direction of operation of the mechanism for feeding the carriage 17 after the latter has passed a predetermined point in moving to the right as viewed in Fig. 1. Then, the ensuing reverse movement of the carriage, that is to the left, is interrupted positively when the tool head 18 reaches the proper position.

In the present instance, such return motion of the carriage 17 is preferably arrested by a positive stop 38 which is projected into the path of movement of a lateral projection 39 on the carriage 17. The stop 38 is normally maintained out of the path of movement of the projection 39 by a solenoid 40 having an armature 41 attached to the lower end of the stop. The solenoid is mounted on the side of the bed frame 21 and its energization is preferably controlled by the control circuit which controls the power-units 32 and 33 as is hereinafter described. Upon the deenergization of the solenoid 40, the stop 38 is projected upwardly by a compression spring 42 interposed between the lower portion of the stop and the upper portion of the solenoid casing as best shown in Fig. 3.

The power unit 32 is adapted not only to drive the tools carried by the tool heads 16, but is also adapted to effect relative motion between the tool heads 16 and the work support. To this end, the unit is arranged to feed the carriage 17 back and forth along the horizontal ways 20 on the bed 21. The construction of the unit and its control mechanism are fully disclosed in Patent No. 2,040,872 to which reference may be made for further details. The operating mechanism is housed within a casing 43 and includes a combined tool drive and feed motor 44 which, as illustrated diagrammatically in Fig. 5, drives the shaft 31 which is in turn connected in driving relation through the gears 29 and 30 to the shaft 24 and through gears 23 to the spindle to which the milling cutters 12 are attached. The motor operates through the medium of a separate worm and spur gear train 45 to drive one terminal element of a differential gearing 46 having its intermediate element fast on a nut 47 rotatably mounted in the casing 43 and threaded onto an elongated screw 48 which is rigidly secured to the bed frame 21 adjacent the ways 20. The screw 48 is held against rotation and it will thus be apparent that operation of the motor 44 will produce corresponding feeding movement of the carriage 17. Preferably the tools are moved to the work piece and retracted out of the work at a rapid traverse rate, this being accomplished by operation of a motor 49 arranged to drive the other terminal element of the differential gearing 46.

The power unit 33 is in general similar in construction to the power unit 32 described above and is adapted not only to drive the drills or other tools 13, but is also adapted to move the tools into and out of operative engagement with the work. The power unit 33 thus includes an enclosing casing 50 constituting a housing for a combined tool drive and feed motor 51. This motor is connected to the drills 13 through a suitable gearing 52 contained in the tool head 18. A worm and spur gear drive 53 serves to connect the motor 51 in driving relation with one terminal element of a differential gear mechanism 54. The intermediate element of the differential gear mechanism is fast on a nut 55 rotatably mounted in the casing 50 and threaded on a screw 56. The latter is held against rotation and one end thereof is secured to the carriage 17. It will be apparent that operation of the motor 51 will produce corresponding feeding movement of the tool head 18 along the vertical front face of the column 19. Preferably the tools are moved into and out of engagement with the work piece at a rapid traverse rate, this being accomplished by the operation of a motor 57 arranged to drive the other terminal member of the differential gearing 54.

A control arrangement has been provided by means of which the power units 32 and 33 are automatically controlled, preferably by a single actuation initiation member to move the cutters 12 and then the drills 13 sequentially into and out of operative engagement with the work piece. A starting push button 58 conveniently mounted on the front of the bed frame 21 serves to initiate the complete operating cycle of the machine.

Thus, in the operation of the machine described, closure of the push button 58 (see Fig. 5) initiates the operation of the machine from its starting position shown in dotted lines at the right hand side of Fig. 1. In this cycle of operation, which is diagrammatically illustrated in Fig. 6, the carriage 17 is moved to the left (as viewed in Fig. 1) at a rapid traverse rate until the cutters 12 are in a position to engage the first of the spring pads 10. The cutters are then moved across the first of the pads 10 at a slower feed rate while being simultaneously rotated. After having moved across the tops of the first spring pads 10, the carriage 17 is then moved to the left for a short distance at a rapid traverse rate until the cutters 12 engage the second spring pads 10. Next, the cutters 12 are fed across the tops of the second spring pads 10 at a slower feed rate. The carriage 17 is then retracted at a rapid traverse rate until it passes a predetermined point approximately midway in its path of movement.

The direction of movement of the carriage 17 is reversed in response to its passage past this predetermined point and the return movement of the carriage 17 is arrested by the stop 38 so that the drills 13 are accurately positioned above the portions of the spring pads 10 machined by the milling cutters 12. The power unit 33 then moves the tool head 18 downwardly at a rapid traverse rate until the drills 13 engage the spring pads 10, after which the drills 13 are moved downwardly at a slower feed rate. Upon completion of the drilling operation, the tool head 18 is again retracted at a rapid traverse rate. After the completion of the retractive movement of the tool head 18, the power unit 32 returns the carriage 17 to its original starting position shown in dotted lines at the right hand side in Fig. 1. After having thus returned to its original starting position, the machine is again ready for the initiation of its next similar cycle upon closing the push button 58.

The operation of the machine may be stopped at any time desired by a second push button 59 located adjacent the push button 58. In addition, push buttons 60 and 61 (see Fig. 5) are adapted to respectively start and stop the power unit 32 independently of the power unit 33 so that only one power unit may be used if desired.

Electrical energy is supplied to the motors of the power units 32 and 33 from power supply lines 62, 63 and 64 of a suitable three-wire electrical supply system. The connection of the motors 44 and 49 of the power unit 32 to the supply lines is controlled by a contactor 65 having an actuating coil 66. The connection of the motors 51 and 57 of the power unit 33 to the supply lines is similarly controlled by a contactor 67 having an actuating coil 68.

Upon closure of the starting push button 58, one terminal actuating coil 69 of a starting relay 70 is connected to the supply line 63 through a conductor 71, the normally closed push button 59, push button 58, and conductor 69ª. The other terminal of the actuating coil 69 is permanently connected to the power line 62 by a conductor 72. Upon such energization of the actuating winding 69, the contacts 73 of the relay 70 are closed by a bridging member 74, thus completing an energizing circuit for the actuating winding 66 of the contactor 65. This energizing circuit for the winding 66 extends from the power supply line 62 through the conductor 72, conductors 75 and 75ª, normally closed cam switch 76, limit switch 77, conductor 78 to one terminal of the winding 66.

The other terminal of the winding 66 is connected to the power supply line 63 through conductor 79, contacts 73 and bridging member 74, conductor 80, normally closed contacts 81 and bridging member 82 of a relay 83, conductors 84 and 85, cam switch 86, conductor 86ª, normally closed push button 61, and conductors 88 and 71.

Upon such energization of the winding 66, the contactor 65 is closed, thus connecting the feed motor 44 to the power supply lines through branch conductors 62ª, 63ª and 64ª, and also connecting the rapid traverse motor 49 to the power supply lines through cam switches 89 and 90. As a result of such energization of the motors 44 and 49, the carriage 17 is moved to the left, as viewed in Fig. 1, with a rapid traverse motion.

A holding circuit is provided for the contactor 65 so that the winding 66 thereof will not be deenergized upon subsequent release of the starting push button 58 and consequent deenergization of the starting relay 70. This holding circuit for the winding 66 includes contacts 91 on the contactor 65 which are closed by a bridging member 92 upon energization of the winding 66. Conductor 79, contacts 91, bridging member 92 and a conductor 93 complete the holding circuit, which is in shunt with the contacts 73 of the starting relay 70.

An arrangement has been provided for automatically controlling the operations of the motors of the power units 32 and 33 so that the desired variations in speed of movement of the tool heads 16 and 18 may be had. In the preferred construction illustrated, changes in direction, as well as speed of movement of the tool heads, are effected by starting and stopping the rapid traverse motors 49 and 57 and by reversing the same. The energization, as well as direction of rotation, of the rapid traverse motors 49 of the power unit 32, for example, is controlled by a cam operated switch including the switch members 86, 89 and 90 as well as reversing switch members 94 and 95. These switch members are actuated to their open and closed positions in predetermined sequence by a series of rotatable actuating members which are intermittently rotated by a suitable ratchet and pawl mechanism 96. This ratchet and pawl mechanism is, in turn, actuated by a dog disc 97 driven by the intermediate member of the differential gear mechanism 46 through a gear connection 98. The spaced dogs 99 on the disc 97 actuate the ratchet and pawl mechanism to open and close the switch members at predetermined intervals in timed relation with the rotation of the nut 47 on the shaft 48.

After the carriage 17 has moved to the left with a rapid traverse motion, the rapid traverse motor 49 is deenergized and then stopped by a normally engaging brake 100 having a solenoid operating coil 101 which serves to maintain the brake released when the solenoid is energized. Since the solenoid and motor are connected to the same circuit the brake is applied upon deenergization of the motor. The carriage 17 then continues its movement to the left at a slower feed rate. This change in speed is effected just before the milling cutters 12 contact with the first of the spring pads 10. The first projection 99 on the disc 97 is so positioned that the pawl and ratchet mechanism 96 will be actuated at the desired point in the traversing movement of the carriage 17. Upon this first actuation of the ratchet and pawl mechanism, the switch controlling rocker arm is rotated so as to open switch arms 89 and 90, thus deenergizing the rapid traverse motor 49 and at the same time, deenergizing the brake solenoid 101 so that the brake 100 is permitted to stop the motor 49 due to its normal biasing pressure.

After the deenergization of the rapid traverse motor 49, described above, the feed motor 44 continues to move the carriage to the left as viewed in Fig. 1 at a relatively slower feed rate while the milling cutters 12 are machining flat surfaces on the first of the spring pads 10. The second projection 99 on the disk 97 is positioned so as to actuate the ratchet and pawl mechanism 96 a second time upon the completion of this milling operation. The second actuation of the pawl and ratchet mechanism 96 re-closes the switch arms 89 and 90, thus reenergizing the rapid traverse motor 49 as well as the brake solenoid 101 so that the brake 100 is released and the carriage is again moved to the left with a rapid traverse movement. This movement is continued until the milling cutters 12 are substantially in engagement with the second set of spring pads 10 at which time the third projection 99 on the disc 97 engages the pawl and ratchet mechanism 96 to again open the switch arms 89 and 90. Subsequent to this second opening of the cam switches 89 and 90, the carriage again moves to the left at a slower feed rate as before until the milling of the surfaces of the second set of spring pads 10 is completed.

The control arrangement is adapted to cause the carriage 17 to be retracted at a rapid traverse rate as soon as the machining of the surfaces of all of the spring pads 10 is completed by the milling cutters 12. In order to effect this operation, the cam switch is adapted to open the switches 89 and 90 and close the switches 94 and 95 upon the actuation of the pawl and ratchet mechanism by the last projection on the disc 97, which takes place coincident with the completion of the feeding movement of the carriage. Upon such closure of the switches 94 and 95, the connections of the rapid traverse motor 49 are reversed and consequently, the direction of rotation of the nut 47 on the screw 48 is also reversed so that the carriage 17 is moved to the right, as viewed in Fig. 1, at a rapid return rate.

As was noted above, an arrangement has been provided for accurately positioning the carriage 17 in such manner that the tools carried by the tool head 18 will be positioned in predetermined relation with respect to the work piece. Accordingly, a normally open limit switch 102, positioned on the inner surface of a side wall of the bed frame 21 about mid-way of its length, is utilized to reverse the direction of movement of the carriage 17. As best shown in Fig. 4, the limit switch 102 includes a pivotally mounted actuating arm 103 adapted to contact with a roller 104 carried by a pivotally mounted switch arm 105, which is normally biased to its open position, and move the latter into its closed position. A depending pivotally mounted dog 106 carried by the carriage 17 engages the upper end of the arm 103 and moves the switch to its closed position when the carriage moves to the left (as viewed in Fig. 4, right as viewed in Fig. 1), swinging movement of the dog 106 being limited by a stop 106ª. When the carriage moves in the opposite direction, toward the work support, the dog 106 rides freely over the top of the actuating arm 103 and consequently does not close the switch.

As the carriage 17 moves to the left in its retractive movement, the dog 106 closes the limit switch 102. Upon such closure of the limit switch 102, actuating winding 107 of stopping relay 83 is energized. The energizing circuit for the winding 107 extends from the power supply line 62 through conductor 72 to one terminal of the winding and from the other terminal of the winding through conductor 108, limit switch 102, conductor 109, conductor 88, normally closed push button switch 59, and conductor 71 to the power supply line 63.

The stopping relay 83 is effective to break the holding circuit of the actuating winding 66 for the line contactor 65 of power pack 32 so that both of the motors 44 and 49 thereof will be deenergized when the carriage 17 passes the limit switch 102. This opening of the holding circuit of the contactor 65 is effected by the opening of normally closed contacts 82 of relay 83. The effect of simultaneously deenergizing both of the motors 44 and 49 is to reverse the direction of movement of the carriage 17 by the motors. This is due to the fact that the brake 100 immediately stops the rapid traverse motor 49 upon deenergization of the solenoid 101 so that one terminal member of the differential gearing 46 is no longer rotated. The motor 44, however, has sufficient momentum that it continues to rotate for a few revolutions while it coasts to a stop, and the net effect on the differential gearing 46 is to reverse the direction of movement of the nut 47 along the screw 48.

This reverse motion of the carriage 17 is positively arrested at a predetermined position by engagement of the stop 38 with the projection 39, so that the tool head 18 is accurately positioned with respect to the machined surfaces of the spring pads 10. In view of the screw and nut drive, the carriage is held effectually with the projection 39 engaging the stop without continuing the energization of either of the motors. As will be seen in Fig. 5, the solenoid 40 is connected in parallel relation with the feed motor 44 and is consequently deenergized upon the opening of line contactor 65. This deenergization of the solenoid 40 permits the compression spring 42 to project the stop 38 into the path of movement of the projection 39 on the carriage 17.

The stopping relay 83 also serves to condition the vertically movable power unit 33 for actuation. Thus energization of the actuating coil 107 of the relay 83 not only opens contacts 82 but also causes a bridging piece 110 to close normally open contacts 111. Upon the closure of these contacts 111 by bridging member 110, an energizing circuit is completed for the actuating coil 112 of a starting relay 113 for the power unit 33. This energizing circuit extends from the electrical supply line 62 through conductors 72, 75 and 75a, cam switch 76, limit switch 77, and conductors 78 and 114, to one terminal of the winding 112. The other terminal of the winding is connected to power supply line 63 through conductor 115, contacts 111 of relay 83, conductors 84 and 85, cam switch 86, normally closed push button 61, conductor 88, normally closed push button 59 and conductor 71.

The starting contactor 113 is effective not only to energize the actuating winding 68 of the main contactor 67 of power unit 33 but also to energize an independent holding relay therefor. Thus, upon energization of winding 112 of starting relay 113 contacts 116 and 117 thereof are closed by bridging members 118 and 119, respectively. The closure of contacts 117 completes a circuit in which the actuating winding 68 of main contactor 67 as well as actuating winding 120 of holding relay 121 are connected in parallel relation to the power lines. Thus, adjacent terminals of the windings 68 and 120 are interconnected by conductors 72 and 122, respectively. Also, the conductor 72 which interconnects the opposite terminals of the coils 68 and 120 is connected to power supply line 62, while the conductor 122 is, in turn, connected to the power supply line 63 through conductor 123, contacts 117 of starting relay 113, conductor 124, normally closed contacts 125 of contactor 65, conductors 126 and 127, cam switch 128, conductor 129, normally closed push button 130, conductor 132, normally closed push button 59 and conductor 71.

In connection with the circuit arrangement described above, it should be particularly noted that a safety interlocking arrangement has been provided for effectively preventing the closing of contactor 67 of the power unit 33 when the main contactor 65 of power unit 32 is closed: that is, the contacts 125 carried by contactor 65 are closed only when the main line contacts of the contactor are open so that only during this latter period is it possible to complete an energizing circuit for contactor 67.

A separate control arrangement has been provided for effecting actuation of the power unit 33 independently of the power unit 32. The separate control arrangement for power unit 33 includes a normally open starting push button 131 and the normally closed stop push button 130. Upon closure of the starting push button 131 a circuit is completed from the conductor 122, which interconnects the adjacent terminals of windings 120 and 68, to power supply line 63 through a conductor 133, push button 131, conductor 134, conductor 127, cam switch 128, conductor 129, normally closed push button 130, conductor 132, normally closed push button 59, and conductor 71. The opposite terminals of the coils 120 and 68 are permanently connected to the supply line 62 through conductor 72.

In the normal complete cycle of operation, the contactor 67 is closed upon actuation of the starting relay 113 as described above. The simultaneous actuation of relay 121 causes a bridging member 134 to close the contacts 135 thereof. The closure of these contacts 135 completes a holding circuit for the relay 121 and contactor 68 independent of the starting relay 113. Thus, contacts 135 and the conductor 136 are shunted across the circuit formed between conductors 122 and 127 by conductor 123, contacts 117 of starting relay 113, conductor 124, contacts 125 and conductor 126.

The closure of the main contactor 67 for power unit 33 completes the energizing circuits for the feed motor 51 through branch conductors 62b, 63b and 64b, and for rapid traverse motor 57 through switch arms 143. As a consequence, the nut 55 is rapidly rotated on the screw 56 through the medium of the differential gear mechanism 54 so that a rapid traverse downward movement is imparted to the tool head 18 and the drills 13 are simultaneously rotated. A cam switch arrangement, similar to that described above with respect to power unit 32, is provided for sequentially changing the rate and direction of traversing movement imparted to the tool head 18. This arrangement includes cam disc 137 having dogs 138 thereon, driven by the nut 55 through suitable gearing 139. The projections 138 on the cam 137 intermittently actuate a ratchet and pawl mechanism 140 which, in turn, moves a rock shaft which controls the opening and closing of switch arms 76 and 128 as well as control switch arm 141 and reversing switch arms 142 and 143. These switch arms 142 and 143 control the energization and direction of rotation of the rapid traverse motor 57.

After the tool head 18 has been moved downwardly at a rapid traverse rate for a sufficient distance that the drills 13 are substantially in contact with the machined surfaces of the spring pads 10, the first projection 138 on the disk 137 actuates the ratchet and pawl mechanism 140 to cause the switch arms 143 to be opened. The rapid traverse motor 57 is thus deenergized as is a solenoid brake releasing coil 144. The solenoid 144 serves to maintain a normally engaged brake 145 in its disengaged position when the solenoid is energized. Consequently, the opening of switch arms 143 causes the brake 145 to be applied and prevents further rotation of the rapid traverse motor 57. The continued rotation of the feed motor 51 causes the tool head 18 to be moved downwardly at a relatively slower feed rate until the drills 13 have completed their drilling operation.

It should be noted that the downward movement of the power unit 33 and tool head 18 causes a projection 146 (see Fig. 1) on the power unit to disengage the normally open limit switch 77. This opening of the limit switch 77 deenergizes the actuating winding 112 of starting relay 113 by breaking its connection with the power supplying line 62. This deenergization of the relay 113 and consequent opening of its contacts 116 and 117 does not, however, open the main contactor 67 since the actuating coil 68 of the latter is energized through the holding circuit described above, which is independent of the starting relay 113.

Upon the completion of the feeding movement of the drills 13, the downward movement of the power unit 33 is arrested and it is caused to move upwardly to its original position with a rapid return movement. This change in direction of movement is effected by the closing of the reverse switch arms 142, which reenergize the rapid traverse motor 57 but this time for operation in a reverse direction. The switch arms 142 are closed by the second actuation of the pawl and ratchet mechanism 140, by the second projection 138 on the cam 137.

The motors 51 and 57 of the power unit 33 are deenergized by the opening of the main contactor 67 when the power unit 33 and its attached tool head 18 reach their original uppermost position. This opening of the main contactor 67 is effected by the momentary opening of the cam operated control switch 128 by the cam actuating mechanism. As a result, the actuating windings 68 and 120 of the main contactor 67 and its holding relay 121, respectively, are disconnected from the power supply line 63. The power pack 63 is thus stopped in its uppermost position at the completion of its rapid return movement.

The last actuation of the pawl and ratchet mechanism 140 by the cam 137 also serves to momentarily close the cam operated switch 141. The closure of this switch conditions the control circuit for closure of the main contactor 65 of the power unit 32 so that the latter power unit may be returned to its original starting position. This second closure of the contactor 65 is effected through a relay 150 having an actuating winding 151. One terminal of the winding 151 is connected to the power supply line 63 through a conductor 152, conductors 84 and 85, cam switch 86, normally closed push button 61, conductor 88, normally closed push button 59, and conductor 71. The other terminal of the actuating winding 151 is connected to the power supply line 62 upon closure of the cam switch 141 through a circuit including conductors 153 and 154, cam switch 141 and conductors 75 and 72. This energization of the relay 150 causes its contacts 155 and 156 to be closed by bridging members 157 and 158, respectively.

The contacts 156 complete a holding circuit for the relay 150, which is independent of the cam operated switch 141. Thus the actuating winding 151 is connected to the supply line 62 independently of the cam operated switch 141 through a conductor 159, contacts 153, a conductor 160, and conductor 72.

The closure of contacts 155 of the relay 150, on the other hand, completes an energizing circuit for the actuating coil 66 of the contactor 65. This energizing circuit is preferably interlocked with the power unit 33 so that the contactor 65 cannot be closed to effect a further retractive movement of the power unit 32 unless the power unit 33 is in its upper position. This interlocking arrangement thus precludes the possibility of breaking the drills 13 by moving the carriage 17 to the right, as viewed in Fig. 1, when the tool head 18 is in its lowered position. The interlocking arrangement illustrated includes the normally open limit switch 77, this limit switch being closed only when the power unit 32 is in its retracted or upper position. Thus upon closing of contacts 155 of relay 150, a circuit is completed from the power supply line 63 to one terminal of the actuating coil 66 of the contactor 65 through conductor 71, normally closed push button 59, conductor 88, normally closed push button 61, conductor 86a, cam switch 86, conductors 85, 84 and 152, contacts 155, conductor 161, and conductor 79. The other terminal of the winding 66 is connected to power supply line 62 by a circuit including the limit switch 77. This circuit extends from the winding 66 through conductor 78, limit switch 77, cam operated switch 76 and conductors 75a, 75 and 72.

Upon the closure of contactor 65 as described above, the motors 44 and 49 of power unit 32 are energized to effect a completion of the retractive movement of carriage 17 to its original position. It will be recalled that upon the deenergization of motors 44 and 49, described above, on the opening of limit switch 102, switch arms 94 and 95 remain closed so that upon reclosure of contact 65, the rapid traverse motor 49 will be rotated in the proper direction to effect a rapid return movement of the carriage 17 to its original position.

When the carriage 17 reaches its original position, the contactor 65 is opened so as to stop motors 44 and 49. This opening of the contactor 65 is effected by means of the opening of cam operated switch arm 86. This latter switch is opened by the contacting of the first projection 99 on the cam 97 with the ratchet and pawl mechanism 96. Upon such opening of the switch arm 86, the energizing circuit for actuating coil 151 of relay 150 is opened and the relay is thus deenergized. The consequent opening of the contacts 155 thereof open-circuits the actuating coil 66 of contactor 65 and allows the latter to drop open.

It will thus be seen that at the completion of the automatic cycle described above, all of the parts of the machine are returned to their original positions. In addition, the elements of the control circuit are also returned to their original positions so that the entire apparatus is in readiness to again perform its cycle of operation upon the closure of starting push button 58. The operation of the machine may be stopped during any part of the cycle described above by opening the normally closed stop push button 59. It will be seen that this push button is located in the supply circuits from the main supply line 63 to the actuating coils of both of the main contactors 65 and 67 so that opening of the stop push button results in an immediate deenergization of both power units. Similarly, the normally closed push buttons 61 and 130 may be utilized to stop the individual power units 32 and 33, respectively, at any particular point in their respective cycles of operation.

It will thus be apparent that a machine tool has been provided in which one or more metal removing operations may be carried out with great accuracy as regards the relative positioning of the metal removing tools and work piece. Moreover, a plurality of such metal removing operations may be carried out sequentially by the above described machine tool with a minimum amount of manipulation of the controls of the machine by the operator. Despite the fact that the preferred control arrangement is sufficiently comprehensive to allow a complete automatic cycle of operation, the arrangement of the parts of the machine, as well as of the parts of the control arrangement, is flexible enough that major changes in the metal removing operations to be performed, as well as the sequence of their performance, may be readily effected.

While I have shown a particular embodiment of the invention in connection with a machine tool designed to perform certain described metal removing operations, it should be understood that it is not desired to limit the invention to the particular construction shown and that it is intended, in the appended claims, to cover all modifications within the spirit and scope of the invention.

I claim as my invention:

1. A machine tool comprising, in combination, a work supporting member, a tool supporting member, driving means including an electric driving motor operatively connected to a differential gear mechanism for effecting relative movement between said members, means including a reversible second electric driving motor operatively connected to said differential gear mechanism for selectively changing the direction and speed of the relative movement effected between said members by said driving means, control means responsive to the movement of one of said members past a predetermined point for deenergizing both of said motors and for positively stopping one of said motors, the momentum of the other of said motors in coasting to a stop being sufficient to return said one member to a predetermined position with respect to the other of said members, and means for automatically interposing a positive stop in the path of movement of said one member to effect accurate positioning of said members with respect to each other when said one member has returned to a predetermined position.

2. A machine tool comprising, in combination, relatively movable work and tool supports, reversible electric motor driving means for imparting indexing movements to one of said supports, circuits controlling said driving means to govern the direction of movement of the movable support, means responsive to the movement of said movable support by said driving means in one direction past a predetermined position to control said circuits and reverse the effective direction of operation of said driving means, and a stop positioned to interrupt the resulting reverse movement of said movable support.

3. A machine tool comprising, in combination, a work supporting member, a tool supporting member, reversible actuating means including an electric driving motor for effecting relative movement between said members, a movable stop biased to a position in the path of movement of one of said members, a solenoid for retracting said stop out of the path of movement of said one member, means responsive to the movement of said one member past a predetermined point for reversing the direction of movement of the member by said actuating means, and means for automatically deenergizing said solenoid to release said stop and for deenergizing said motor to effect accurate positioning of said members by positively arresting the return movement of said one member when it has returned to a predetermined position with respect to the other of said members.

4. A machine tool comprising, in combination, a work support, a tool support, power actuated means for effecting relative movement between said work support and said tool support, a second tool support, means for movably supporting said second tool support on said first named tool support to effect positioning of said work support and said second tool support in operative relation upon relative movement between said work support and said first named tool support, a second power actuated means for effecting relative movement between said second tool support and said work support, and control means including a single actuation-initiating control member for sequentially initiating actuation of said first named and second power actuated means to effect sequential engagement of tools carried by said tool supports and a work piece carried by said work support.

5. A machine tool comprising, in combination, a work support adapted to maintain a work piece in position thereon, a metal surfacing tool and a tool support therefor, means for effecting relative movement between said tool and said work support to perform a surfacing operation on the work piece, a metal removing tool and a tool support therefor mounted on said first named tool support, and means for effecting relative movement between said second tool support and said work support to bring said metal removing tool into operative relation with the surface fashioned on the work piece by said metal surfacing tool.

6. A machine tool comprising, in combination, a work support adapted to maintain a work piece in position thereon, a metal surfacing tool and a tool support therefor, means for effecting relative movement between said tool and said work support to perform a surfacing operation on the work piece, a drill and a support therefor mounted on said first named tool support, and means for effecting relative movement between said second tool support and said work support to bring said drill into operative relation with the surface fashioned on the work piece by said metal surfacing tool.

7. A machine tool comprising, in combination, a work support adapted to maintain a work piece in position thereon, a metal surfacing tool and a tool support therefor, driving means for effecting relative movement between said tool and said work support to perform a surfacing operation on the work piece, a metal removing tool and a tool support therefor mounted on said first named tool support, a second driving means for effecting relative movement between said second tool support and said work support to bring said metal removing tool into operative relation with the surface fashioned on the work piece by said metal surfacing tool, and a control means including a single actuation-initiating control member for sequentially initiating actuation of said first named and second driving means to effect sequential engagement of said metal surfacing tool and said metal removing tool with a work piece carried by said work support.

8. A machine tool comprising, in combination, a work support, a tool support, power actuated means for effecting relative movement between said work support and said tool support along a predetermined path of movement, a second tool support, a second power actuated means for effecting relative movement between said second tool support and said work support along a path of movement angularly disposed with respect to said first path of movement, and control means including a single actuation-initiating control member for sequentially initiating actuation of said first named and second power actuated means to effect sequential engagement of the tools carried by said tool supports and a work piece carried by said work support.

9. A machine tool comprising, in combination a work support, a tool support, power actuated means for selectively effecting relative movement between said work support and said tool support at a rapid traverse rate and at a relatively slower feed rate, a second tool support, a second power actuated means for selectively effecting relative movement between said second tool support and said work support at a rapid traverse rate and at a relatively slower feed rate, and control means including a single actuation-initiation control member for initiating operation of said power actuated means in predetermined sequence to perform a complete cycle of operation in which said tool supports are sequentially brought into operative relation with a work piece on said work support at a rapid traverse rate and then at a feed rate.

10. A machine tool comprising, in combination, a work support, a tool support, power actuated means for selectively effecting relative movement between said work support and said tool support at a rapid traverse rate and at a relatively slower feed rate, a second tool support, a second power actuated means for selectively effecting relative movement between said second tool support and said work support at a rapid traverse rate and at a relatively slower feed rate, control means including a single actuation-initiation control member for initiating operation of said power actuated means in predetermined sequence to perform a complete cycle of operation in which said tool supports and work supports are sequentially brought into operative relation at a rapid traverse rate then at a feed rate and retracted at a rapid traverse rate, and means including an interlock between said power actuated means for preventing actuation of one of said power actuated means until the other of said power actuated means has completed a predetermined portion of its cycle of operation.

11. A machine tool comprising, in combination, a work support, a tool support including a tool head, power actuated tool driving and relative tool and work feeding mechanisms carried wholly by said tool support and movable as a unit therewith, a second tool head, means for movably supporting said second tool head on said tool support to effect positioning of said work support and said second tool head in operative relation upon relative movement between said work support and said first named tool head, and a second power actuated tool driving and relative tool and work feeding mechanisms carried wholly by said second head and movable as a unit therewith.

12. A machine tool comprising, in combination, a work support, a tool support including a tool head, power actuated tool driving and relative tool and work feeding mechanisms carried wholly by said tool support and movable as a unit therewith, a second tool head, ways on said tool support slidably supporting said second tool head for movement in a path angularly disposed with respect to the path of relative movement between said work support and said tool support, said tool support and said work support being relatively movable to a position in which said path of movement of said second tool head intersects a work piece carried by said work support, and a power actuated tool driving and feeding mechanism carried wholly by said head and movable as a unit therewith for moving said second head toward and away from said work support.

13. A machine tool comprising, in combination, means providing a slideway, a self-contained tool actuating unit including a unitary frame mounted to reciprocate in said slideway, a prime mover thereon and tool driving and feeding mechanism driven thereby, a second slideway on said frame, a second self-contained unit mounted to reciprocate in said second slideway and carrying an independent prime mover and tool driving and feeding mechanism driven thereby, and means responsive to the movements of one of said actuating units to control the driving mechanism of the other unit whereby to initiate movement of the latter unit.

14. A machine tool comprising, in combination, means providing a slideway, a self-contained tool actuating unit including a unitary frame mounted to reciprocate in said slideway, a prime mover thereon and tool driving and feeding mechanism driven thereby, a second slideway on said frame, a second self-contained unit mounted to reciprocate in said second slideway and carrying an independent prime mover and tool driving and feeding mechanism driven thereby, and means responsive to a movement of each of said units to initiate an operating movement of the other unit.

15. A machine tool having, in combination, work and tool supports mounted for relative movement along one path to present a work piece on the work support for machining by tools on the tool support, said supports also being mounted for relative movement in a path transverse to said first mentioned path to bring the positioned work piece and a tool on the tool support into operative engagement for machining the former, power actuated means for relatively moving said supports toward and away from each other along said second path, reversible electric motor driving means for effecting relative movement between said supports along said first path, a pair of abutments on the respective supports arranged to interengage in positive relation upon relative movement between the supports in one direction along said first path whereby to arrest movement of the moving support and accurately locate a work piece relative to a tool on said tool support, and means responsive to relative movement between said supports in the reverse direction along said first path to automatically reverse said driving means after the moving abutment has passed the stationary abutment and cause reverse movement of the moving support until said abutments have come into positive engagement.

16. A machine tool having, in combination, work and tool supports mounted for relative movement along one path to present a work piece on the work support for machining by tools on the tool support, said supports also being mounted for relative movement in a path transverse to said first mentioned path to bring the positioned work piece and a tool on the tool support into operative engagement for machining the former, power actuated means for relatively moving said supports toward and away from each other along said second path, power actuated means for effecting relative movement between said supports in opposite directions along said first path, a pair of abutments on the respective supports arranged to interengage in positive relation upon relative movement between said supports in one of said directions and to pass each other upon movement in the other direction, and means operating automatically during relative movement between said supports in said second direction and after the abutment on the moving support has passed the abutment on the stationary support to control said actuated means and thereby cause reverse movement of the moving support until said abutments have come into positive engagement whereby to locate a work piece on the work support accurately relative to a tool on the tool support.

MARION L. STRAWN.